United States Patent [19]

Snell et al.

[11] Patent Number: 4,734,984
[45] Date of Patent: Apr. 5, 1988

[54] HILLBILLIE'S FORK

[76] Inventors: John M. Snell, Rte. 1 Box 244, Drumright, Okla. 74030; George Spector, 233 Broadway RM 3815, New York, N.Y. 10007

[21] Appl. No.: 890,172

[22] Filed: Jul. 28, 1986

[51] Int. Cl.⁴ ............................................. A47J 43/28
[52] U.S. Cl. ........................................ 30/322; 294/26
[58] Field of Search .................... 7/110, 112; 30/137, 30/147, 148, 150, 322; 294/2, 26

[56] References Cited

U.S. PATENT DOCUMENTS

| | | | |
|---|---|---|---|
| 749,414 | 1/1904 | Washington | 7/112 |
| 1,202,120 | 10/1916 | Stuckel | 294/26 |
| 2,604,350 | 7/1952 | Taylor | 294/26 |
| 3,162,475 | 12/1964 | Van Allen | 30/322 X |
| 4,332,409 | 6/1982 | Stachowicz | 30/322 X |
| 4,539,751 | 9/1985 | Chan | 30/322 |

FOREIGN PATENT DOCUMENTS 382980 11/1932 United Kingdom ................. 30/322

Primary Examiner—E. R. Kazenske
Assistant Examiner—Michael D. Folkerts

[57] ABSTRACT

An improved kitchen implement is provided and consists of a handle and an elongated shank extending from the handle. The shank has a right angle bent end with a curved point tip to remove olives and peppers from bottles and to turn meat when being cooked.

2 Claims, 1 Drawing Sheet

HILLBILLIE'S FORK

BACKGROUND OF THE INVENTION

The instant invention relates generally to kitchen utensils and more specifically it relates to an improved kitchen implement.

Numerous kitchen utensils have been provided in prior art that are adapted to be gripped by the hand and which will hold various articles. For example, U.S. Pat. Nos. 254,427; 1,313,417 and 2,496,062 all are illustrative of such prior art. While these units may be suitable for the particular purpose to which they address, they would not be as suitable for the purposes of the present invention as heretofore described.

SUMMARY OF THE INVENTION

A primary object of the present invention is to provide an improved kitchen implement that will overcome the shortcomings of the prior art devices.

Another object is to provide an improved kitchen implement that can be used to remove olives and peppers from narrow necked bottles.

An additional object is to provide an improved kitchen implement that can be used to turn meat when the meat is in the process of being cooked.

A further object is to provide an improved kitchen implement that is simple and easy to use.

A still further object is to provide an improved kitchen implement that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.
FIG. 2 is a top view thereof.
FIG. 3 is a front view thereof.
FIG. 4 is a front view of a modification having an adjustable hook end.
FIG. 5 is an enlarged detail view as indicated by numeral 5 in FIG. 4.
FIG. 6 is an end view as indicated by arrow 6 in FIG. 5.

DETAILED DESCRIPTION OF THE PREFERRED EMBODIMENTS

Figure 1:
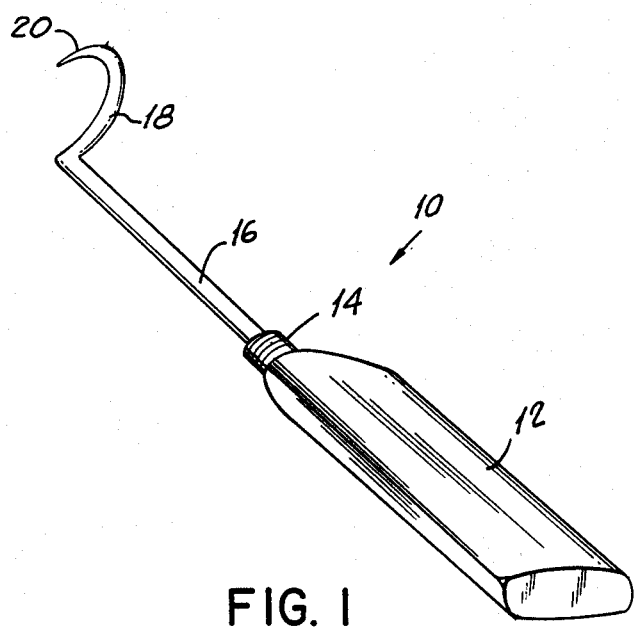
Figure 2:
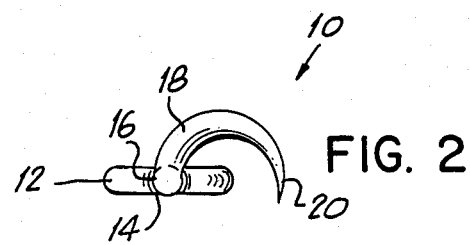
Figure 3:
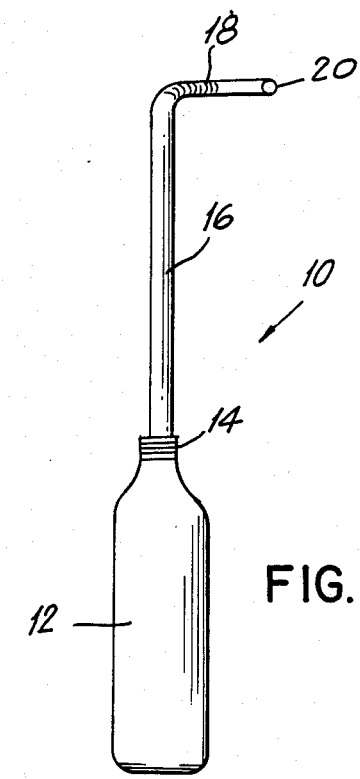

Turning now descriptively to the drawings, in which similar reference characters denote similar elements throughout the several views, FIGS. 1 through 3 illustrate an improved kitchen implement 10 consisting of a handle 12 that has a ferrule 14. The handle 12 is to be gripped by user (not shown) of the implement 10. An elongated shank 16 extends outwardly from the ferrule 14 of the handle 12. The shank 16 has a right angle bent end 18 with a curved pointed tip 20. The implement 10 is used to remove olives and peppers from narrow necked bottles and to turn meat when the meat is in process of being cooked. The handle 12 is fabricated out of non-conductive material, such as wood, plastic, etc. The shank 16 is fabricated out of metal material.

Figure 5:
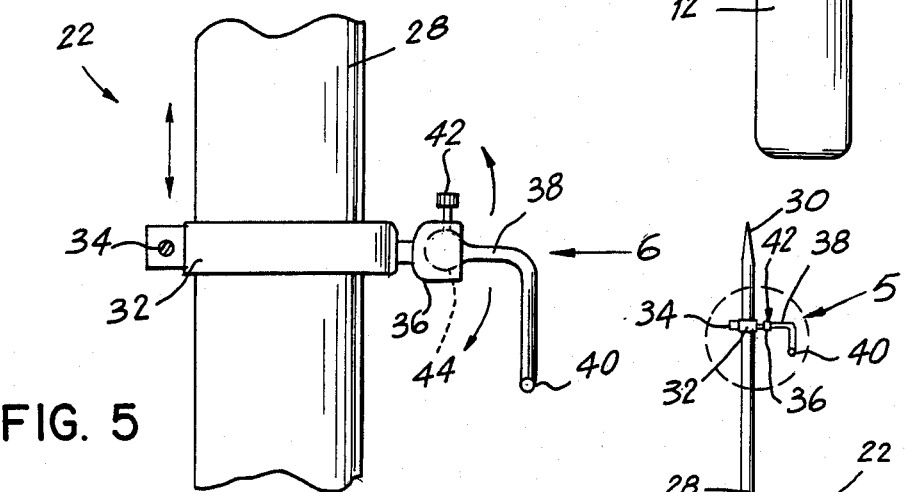
Figure 4:
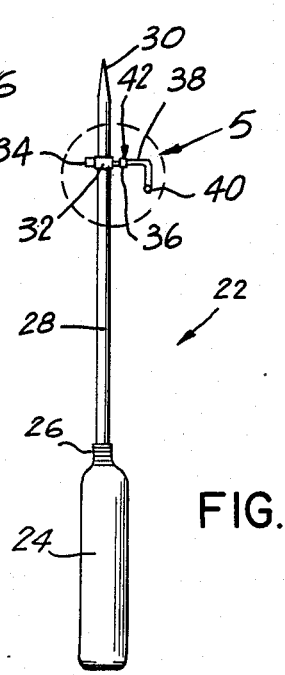
Figure 6:
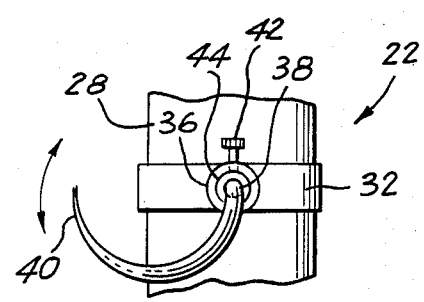

FIGS. 4 thru 6 show a modified improved kitchen implement 22 consisting of a handle 24 that has a ferrule 26. The handle 24 is to be gripped by user (not shown) of the implement 22. An elongated shank 29 extends outwardly from the ferrule 26 of the handle 24. The shank 28 has a straight pointed tip 30 to be used to remove olives and peppers from narrow necked bottles.

A bracket 32 is adjustably clamped by a screw 34 to the shank 28. A locking adjustable ball joint 36 is affixed to the bracket 32 and extends transversely to the shank 28. A right angle bent end 38 extends from the ball joint 36. The bent end 38 has a curved pointed tip 40 to be used to turn meat when the meat is in process of being cooked. The ball joint 36 includes a set screw 42 to lock ball 44 of the ball joint 36 in any desired position. The handle 24 is fabricated out of non-conductive material such as wood, plastic, etc. The shank 28, the bracket 32, the ball joint 36 and the bent end 38 are fabricated out of metal material.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved kitchen implement comprising:
 (a) a handle having a ferrule, said handle to be gripped by user of said implement;
 (b) an elongate shank extending outwardly from said ferrule of said handle, said shank having a straight pointed tip to be used to remove olives and peppers from narrow necked bottles;
 (c) a bracket adjustably clamped to said shank between said ferrule and said pointed tip having a locking ball receiving socket transverse to said shank; and
 (d) a meat handling tool with a ball at one end mounted adjustably in said socket including an outer end extending from said ball having a bent portion with a curved pointed tip disposed transversely to said outer end whereby said tip is positioned for conveniently cooking over a fire, wherein said socket includes a set screw to lock said ball in any desired position.

2. An implement as in claim 1, wherein said bracket is longitudinally adjustable along said shank.

* * * * *